Aug. 28, 1962  LE ROY MILLER  3,051,196
CHECK VALVE
Filed Oct. 24, 1958
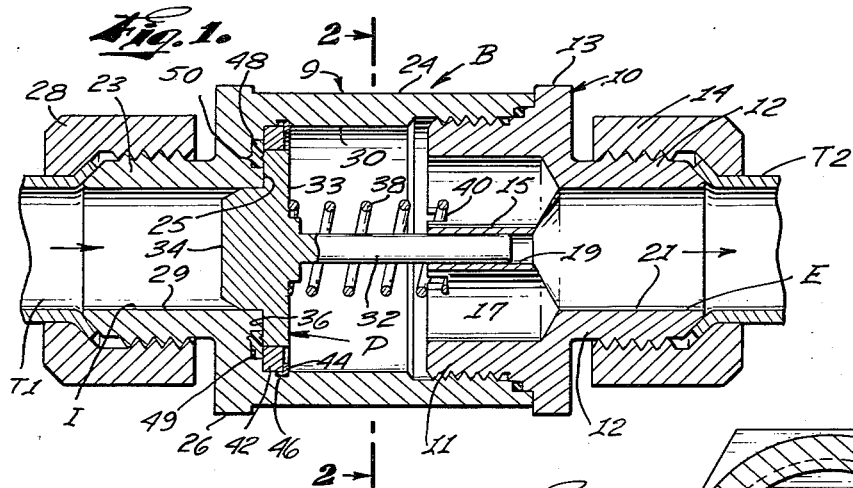
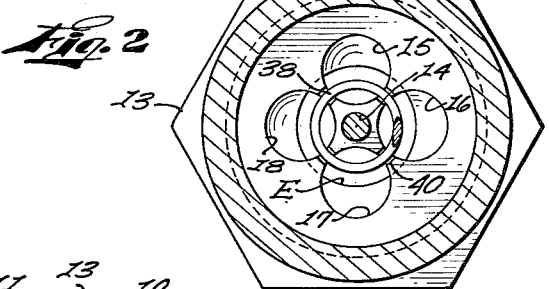
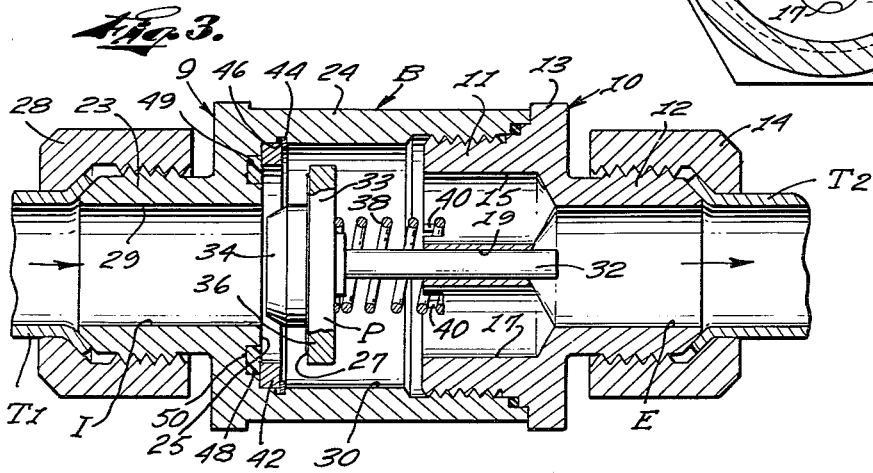
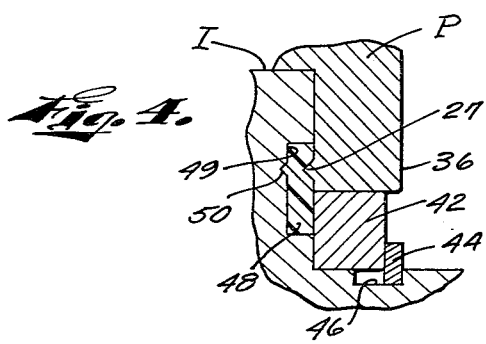
INVENTOR.
LEROY MILLER
BY FULWIDER, MATTINGLY
& HUNTLEY
ATTORNEYS

United States Patent Office 3,051,196
Patented Aug. 28, 1962

3,051,196
CHECK VALVE
Le Roy Miller, Los Angeles, Calif., assignor to Precision Equipment Co., Inc., Torrance, Calif., a corporation of California
Filed Oct. 24, 1958, Ser. No. 769,363
1 Claim. (Cl. 137—516.29)

The present invention relates generally to check valves, and more particularly to a reliable check valve adapted for use in high-pressure hydraulic systems.

Various hydraulic systems incorporate check valves, i.e. valves which permit fluid to flow in only a forward direction. In general, valves of this type include a movable member which is spring-mounted to close the valve until the forward pressure forces the spring to yield.

Important considerations in valves of this type reside in maintaining the movable member freely-movable and responsive to a wide range of pressures. Therefore, a need exists for an economical check valve wherein the movable member is freely-movable, i.e. not likely to bind, and which is operative in response to a wide range of pressures, and capable of withstanding severe environmental conditions.

Seals of resiliently deformable material, as synthetic plastic, are often employed in check valves. The pressures and temperatures encountered by such valves may cause the seal to fail, by extruding the material of the seal from its sealing location. As a result, a need exists for an economical valve employing a resiliently-deformable seal, which is not extruded under extreme pressure and temperature conditions.

It is, therefore, a major object of the present invention to provide a novel and improved check valve.

Another object of the present invention is to provide a check valve adapted for use in high-pressure hydraulic systems and capable of operating under severe pressure and temperature conditions.

Still another object of the present invention is to provide an improved check valve which is responsive to a wide range of pressures.

An additional object of the present invention is to provide a reliable check valve which is simple and economical to manufacture and repair.

These and other objects and advantages of the present invention will become apparent from the following detailed description of a preferred form thereof and from the drawings illustrating that form in which:

FIGURE 1 is a vertical sectional view of a preferred form of check valve constructed in accordance with the present invention and shown in a closed position;

FIGURE 2 is a vertical sectional view taken along line 2—2 of FIGURE 1;

FIGURE 3 is a view similar to FIGURE 1 showing the valve in an open position; and FIGURE 4 is an enlarged fragmentary view of a portion of FIGURE 3 showing a seal utilized in said valve.

Referring now to the drawing, the check valve embodying the present invention is shown connected between tubing sections T1 and T2. The valve includes a generally cylindrical body B having a chamber which contains a fully-guided poppet P. The poppet P is spring-mounted so as to be urged to the left to be seated, and thereby close the intake I to the chamber. When the pressure in the tubing section T1 connected to the intake I exceeds the pressure in the chamber by some predetermined amount, the poppet P is forced to the right, opening the valve and allowing fluid to flow in a forward direction through the chamber to an outlet E connected to the tubing section T2.

The check valve of the present invention will now be considered in greater detail. The body B is formed of a left-hand member 9 and a right-hand member 10, both of which may be made of stabilized austenitic stainless steel, as nickel or cobalt alloys. The generally cylindrical, hollow right-hand member 10 includes integrally formed sections 11 and 12 of different diameters, which are separated by a wrench-receiving hexagonal section 13 (FIG. 2). The sections 11 and 12 each carry external threads. The threads on the section 12 mate with internal threads on a nut 14 to form a coupling to the tubing T2. The threads on the section 12 mate with threads of the left-hand member 9, considered thereafter. Of course, these threads could be formed so that the threads on section 12 are internal.

The right-hand member 10 contains four similar radially-disposed parallel bores 15, 16, 17 and 18 (FIG. 2), and a smaller concentric bore 19, all of which longitudinally extend through the large-diameter section 11 to merge into a single concentric bore 21 through the small-diameter section 12, which comprises the exhaust or outlet E from the valve. The radially-disposed bores 15 through 18 serve as fluid passages, while the concentric bore 19 serves as a guide to telescopically receive and support the poppet P.

The left-hand member 9 of the body B is generally cylindrical and includes integrally-formed sections 23 and 24 of different diameter, separated by a hexagonal wrench receiving section 26. The large-diameter section 24 is internally-threaded and the smaller section 23 is externally-threaded. The large-diameter section 24 threadably receives the large-diameter section 11 of the right-hand member 10 to form the body B. The small-diameter section 23 threadably receives a nut 28 to couple the valve to the tubing section T1. The section 23 may be formed to provide internal threads.

The left-hand member 9 is formed with a concentric bore 29 and a coaxial counterbore 30 of larger diameter through sections 23 and 24 thereof, respectively, so as to define a passage therethrough, an annular shoulder 25 being defined at the juncture of bore 29 and counterbore 30.

The poppet P includes a concentric guide column or stem 32 extending horizontally to the right from an integrally-formed piston 33 including a leftwardly-extending circular, tapered protrusion 34 adapted to fit snugly into the bore 29. An annular shoulder 36 is formed adjacent the protrusion 34 which seats against a seal as hereinafter described.

The stem 32 is telescopically received in the bore 19, and a helical spring 38 on the stem 32 and extends from the piston 33 into an annular recess 40 encircling the bore 19 and traversing the bores 15 through 18 (FIG. 2).

The annular shoulder 36 of the poppet P seats against the annular shoulder 25 inside the left-hand member 9 to close the check valve. The shoulder 25 has an annular serration 27 formed thereon.

When the valve is closed, the protrusion 34 lies in the bore 29, while the remainder of the piston 33 lies within a retainer ring 42. The retainer ring 42 is held in position by a snap ring 44 which fits into an annular recess 46 in the cylindrical wall of the large-diameter section 24 adjacent the shoulder 25.

The retainer ring 42 is provided to support an annular seal 48 having a rectangular cross-section and substantially filling an annular groove 49 formed in the shoulder 25. The seal may be formed of fluorinated hydrocarbon, for example, as Teflon. The groove 49 (FIG. 4) includes a small V-shaped annular indentation 50 in a bottom surface, which accommodates a portion of the seal 48 displaced under pressure.

Reference will now be had to FIGURE 1, which best illustrates the manner in which the check valve of the present invention may be formed. The seal 48 is first placed in the annular groove 49, formed in the shoulder 25 of the left-hand member 9. Next, the retaining ring 42 is placed in position, and the supporting snap ring 44 is placed in the annular recess 46.

The helical spring 38 is placed in the annular recess 40, and the stem 32 of the poppet P is inserted through the spring 38 to be telescopically-received by the bore 19. The poppet P, and the spring 38, are inserted in the left-hand member 9 which is threadably engaged with the right-hand member 10, to form the unit as shown in FIGURE 1. Of course, in connecting the check valve in a hydraulic system, various couplings may be employed to connect the valve to tubing sections T1 and T2.

In considering the operation of the illustrative embodiment, assume the valve is connected in a hydraulic system and that the pressure in the tube T1 is less than the pressure in the tube T2. Under these circumstances, the spring 38 urges the poppet P to the left so that the tapered pilot protrusion 34 passes into the bore 29 to guide the poppet P and facilitate a smooth and guided movement of the poppet P into the center of the bore 29 to engage the shoulder 36 with mating shoulder 25. As these shoulders engage, the serration 27 (FIG. 4) extending from the shoulder 25 deforms the seal 48 causing the seal to flow into the indentation 50. With the poppet P in this position, the seal 50 is completely entrapped by the groove 49, the shoulder 25, and the retaining ring 42, so that regardless of the back pressure developed, the resiliently-deformable material forming the seal 48 may not be extruded and cause the seal to fail. The fully trapped seal 50 is an important feature of the present invention, and withstands severe pressures.

It is also to be noted that the serration 27 engages the seal 48 upon initial contact between the poppet and the seal; therefore, the force existing between these members is concentrated to minimize leakage throughout a wide range of pressures.

Assume now that the pressure in the intake tubing section T1 exceeds the pressure in the exhaust tubing section T2 by an amount sufficient to exert a force upon the poppet P that exceeds the force exerted by the spring 38. The poppet P then moves to the right, fully-guided by the stem 32 telescopically sliding in the bore 30, and the protrusion 34 telescopically sliding in the port 14. When the shoulder 25 of the poppet moves away from the seal 48, the valve is open and fluid may pass through the valve in a forward direction.

It may, therefore, be seen that the aforementioned construction of a check valve readily lends itself to economical manufacture as well as providing a reliable and durable unit capable of operating under severe conditions of temperature and pressure. Furthermore, it is to be noted that the check valve may be disassembled with a minimum effort to facilitate servicing and replacing various parts, as the seal 48. By employing corrosion-resistant materials, as stainless steel, the valve is capable of prolonged periods of use in conjunction with corrosive fluids.

From the foregoing it will be apparent to those skilled in the art that the present invention provides a greatly improved and satisfactory check valve fully capable of achieving the objects and advantages herein set forth. It will be apparent, however, that variations may be made in the check valve without departing from the novel features thereof. Consequently, the present invention is not to be limited to the particular arrangement herein shown and described except as defined by the appended claim.

I claim:

In a check valve having a body formed with a chamber from which extends a bore, with a shoulder being defined at the juncture of said chamber and said bore, and a poppet having a piston formed with a shoulder movable towards and away from the first-mentioned shoulder, the combination of: a groove formed in said first-mentioned shoulder with a relief channel formed in the wall of said groove facing said chamber; a seal of resiliently deformable material positioned in said groove to form a valve seat; a rigid retaining element secured in said chamber and encircling the radially outer portion of said seal and extending away from said valve seat, said retaining element being formed with a bore coaxial with the piston of said poppet whereby at such time as the shoulder of said piston engages the said first-mentioned shoulder said seal will be completely entrapped against flow; a serration formed in the shoulder of said piston and aligned with said relief channel, said serration engaging and deforming said seal into said relief channel as said shoulders are engaged; and a protrusion on the end of said poppet adjacent said juncture formed with a cylindrical portion immediately adpacent said piston engagement about its entire periphery with said bore and a frustoconically-shaped portion on said cylindrical portion opposite said piston, said protrusion being smaller than the length of movement of said piston away from said first-mentioned shoulder to be removed entirely from said bore, the said tapered portion of said protrusion slidably entering said bore as said shoulders are engaged to cause cylindrical portion to positively guide said piston into the bore of said retaining element.

References Cited in the file of this patent

UNITED STATES PATENTS

| | | |
|---|---|---|
| 4,338 | Powell | Apr. 11, 1871 |
| 752,099 | Palmer | Feb. 16, 1904 |
| 1,353,415 | Newsom et al. | Sept. 21, 1920 |
| 1,578,046 | Logan | Mar. 23, 1926 |
| 2,107,200 | Kennon | Feb. 1, 1938 |
| 2,122,189 | Ward | June 28, 1938 |
| 2,409,220 | Melichar et al. | Oct. 15, 1946 |
| 2,745,432 | Williams | May 15, 1956 |
| 2,761,463 | Wagner | Sept. 4, 1956 |
| 2,847,182 | Mancusi | Aug. 12, 1958 |
| 2,885,176 | Bryant | May 5, 1959 |
| 2,936,780 | Pratt | May 17, 1960 |